April 27, 1943.    E. G. DUDEN    2,317,848
HOT PROCESS GRAVITY FILTRATION
Filed Sept. 2, 1939
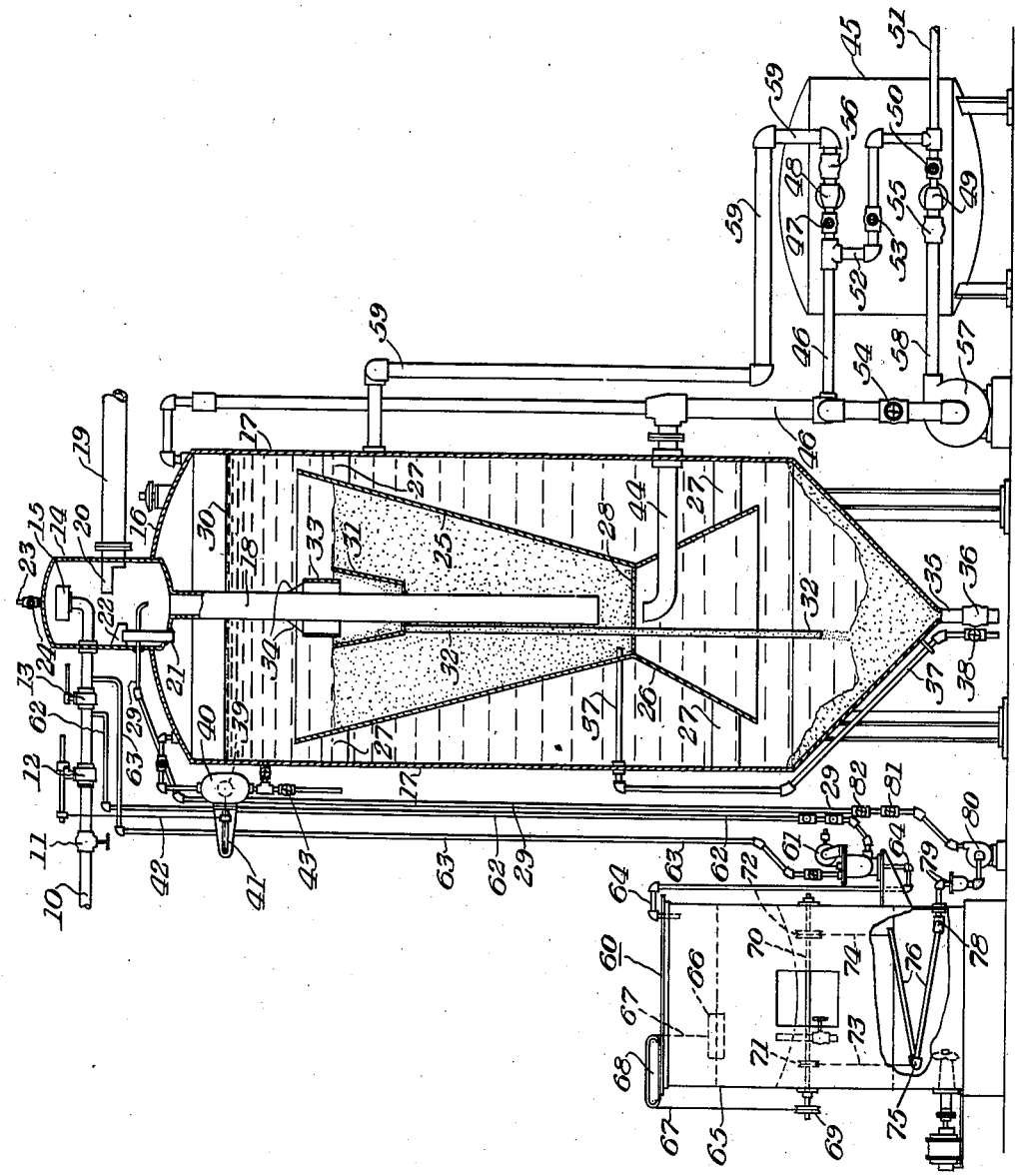
INVENTOR.
Emil G. Duden,
BY Edward A. Lawrence
his ATTORNEY.

UNITED STATES PATENT OFFICE 2,317,848

HOT PROCESS GRAVITY FILTRATION

Emil G. Duden, Oakmont, Pa., assignor to Scaife Company, Oakmont, Pa., a corporation of Pennsylvania Application September 2, 1939, Serial No. 293,259

18 Claims. (Cl. 210—14)

This invention relates generally to water purification and more particularly to apparatus for softening and purifying water by hot process gravity filtration for supplying boiler feed water and the method of operating the same.

The object of the hot process water softening and purification apparatus is to furnish a soft, clear, supply of hot water suitable for boiler feed. In installations of the character in which this process is employed the storage of soft water is not provided, and the apparatus must adapt itself to the demand rates required for operation of the boilers. Thus the water undergoing treatment must be fed at variable rates and the reagents for softening the water must be supplied to the apparatus in quantities proportional to the variable operation.

The principal object of this invention is the provision of an improved reaction settling tank.

Another object is the provision of a combined heater and mixing tank wherein the water to be softened is heated and mixed with reagents.

Another object is the provision of an improved sludge collector.

Another object is the provision of a baffle for directing the flow of sludge and clear water.

Another object is the provision of means for discharging sludge.

In the accompanying drawing a practical embodiment illustrating the principles of this invention is shown wherein the single figure is a side elevation of the water purification apparatus with the mixing, reacting and settling tank in section.

Referring to the drawing, 10 represents the raw water supply pipe provided with the main valve 11, the liquid level control valve 12 and the main orifice valve 13 in the order mentioned. The pipe 10 enters the heater-mixing tank 14 and is provided with a spray nozzle 15 on the end thereof. The jets of the nozzle 15 direct the water in thin films tangentially from the center to the side walls of the tank 14, thereby providing a circular swirling action within the tank.

The heater-mixing tank 14 is welded to the center of the head 16 of the settling tank 17 and is connected at the bottom with the large downcomer pipe 18 which extends down into the reactor tank.

An exhaust steam pipe 19 extends through the wall of the heater mixing tank below the film spray 15 and is provided with a pipe 20 arranged to direct the steam in the tank 14 with the swirling water. The pipe 20 is undercut to prevent spraying of water into steam pipe 19. The steam is supplied under a constant low pressure of approximately three to five pounds per square inch and maintains this pressure within the heater-mixing tank and the space above the clear water level in the settling tank 17. These spaces are connected by the pressure equalizing pipe 21 welded to the base of the tank 14 and having its upper end enclosed by the hood 22 which prevents the raw water from passing directly into the clear water of the settling tank.

The top of the heater-mixing tank 14 is provided with the pipe 23 controlled by the valve 24 for venting the tank to atmosphere.

The reactor tank 25 and the water collector 26 are preferably made integral and supported within settling tank 17 by the radially disposed plates 27 welded to the inner wall thereof. The reactor tank 25 is preferably inverted frusto-conical in shape. The collector 26 is also preferably an upright frusto-conical shell. A dividing plate 28 separates these two tanks at their small diameter as shown on the drawing.

The swirling films of water from the film spray 15 is sprayed through the steam issuing from the pipe 20 and is heated thereby to a temperature within a few degrees of the temperature of the steam. The non-condensable gases which are liberated by the heating of the raw water are permitted to escape to the atmosphere through the vent pipe 23 and the valve 24.

The hot water swirls in the bottom of the tank 14 and the reagents solution is fed thereto through the pipe 29. This solution is caught by the swirling water and becomes thoroughly mixed therewith. The mixture of water and reagents swirls down through the downcomer pipe 18 and discharges into the bottom of the reaction tank 25. The swirling action of the water is nil as it passes out of the downcomer into the bottom of the reaction tank.

Reaction takes place between the raw water and the reagent solution as it is passing through the downcomer pipe 18 and within the reaction tank 27 producing a sludge. This sludge coagulates within the reaction tank 25 forming a sludge bed and the water being treated passes upwardly therethrough and over the top of the tank, and downwardly within the settling tank. The upper edge of the frusto-conical shaped reaction tank is preferably submerged below the water level 30 in the reaction tank.

The volume of the sludge bed in the tank 25 expands and contracts with the increase and decrease in the flow rate of water through the bed. When the top of the sludge bed reaches the top of the sludge collector 31 the sludge flows thereinto and passes down through the pipe 32 to the bottom of the settling tank 17.

The sludge collector tank 31 is preferably an inverted frusto-conically shaped tank with its walls having the same slope as that of the reactor tank. The circular base of the sludge collector is provided with an opening for receiving the downcomer pipe 18 and is welded thereto. The upper edge of the sludge collector is below the upper edge of the reaction tank, thereby preventing the sludge from rising and flowing out of the reactor tank into the settling tank.

A cylindrical baffle 33, of approximately one-half the large diameter of the sludge collector tank, is supported from the downcomer 18 by the hanger rods 34. This baffle is positioned concentrically with the downcomer and its upper edge is below the upper edge of the reaction tank and its lower edge is within the sludge collector below the upper edge thereof as shown.

The coagulating sludge flows toward the sludge collector since the water therein is substantially still. The sludge passes over the top edge of the sludge collector and hugs the wall as it passes down to the bottom as indicated. This action forces the clear water up through the center of the cylindrical baffle 33. The sludge then passes down through the pipe 32 to the bottom of the settling tank 17 which is preferably of inverted conical shape provided with a pipe 35 and valve 36 at the lower end thereof for manually blowing off the sludge to a waste water sump and thence to the sewer. A blow-off pipe 37 controlled by the valve 38 is arranged for discharging the sludge from the bottom of the reactor tank 25.

The old sludge collected and retained in the reactor tank from previous precipitations does not mix readily with the water flowing through it. The sludge acts more like a liquid of much greater density than that of the water and allows the water to pass readily therethrough, accelerating the formation of fresh precipitates, and absorbing the precipitates that formed and which are being formed by the reaction solution.

One of the principal and very important advantages of this process is the fact that approximately ninety-five percent of the precipitates formed in the softening reaction are delivered directly to the bottom of the settling tank through the sludge collector and its discharge pipe 32. This sludge does not have to pass through the water in the settling tank. It is obvious that the clearness of the settled water is very materially improved and the sand filters can be operated for a longer period of time between washings, thereby effecting a saving of water and power for operating the wash pump.

The level 30 of the clear water in the settling tank is maintained by the float 39 in the float box 40. The float operates the lever 41 to which one end of the rod 42 is fastened. The other end of the rod is arranged to operate the valve 12 and thereby maintain a constant level of water in the settling tank. The float box 40 is connected to the settling tank above and below the desired water level in the same manner as that of a sight gage and is provided with a blow-off pipe and valve as indicated at 43.

The clear water flowing up over the wall of the reactor tank then flows downwardly in the settling tank and back up into the conically shaped collector 26 where it is drawn off through the pipe 44, and flows to the sand filter 45, through the pipe 46, inlet valve 47 and enters the filter through the connection 48. The water leaves the filter through the outlet connection 49, the valve 50 and passes through the pipe 51 to the boiler feed pump.

When the filter is being washed the water from the settling tank is directed through the pipes 44 and 46 and the by-pass pipe 52, valve 53 to the service line 51 leading directly to the boiler feed pump. Thus during the washing operation the partly purified water is fed directly to the boiler feed pump.

To wash the filter the wash valves 54, 55 and 56 are opened and the valves 47 and 50 are closed. The pump 57 is then operated, thus drawing the water from the pipe 46 through the valve 54, to the pump 57 and discharged through the pipe 58, the valve 55, upwardly through the filter, out the connection 48, the valve 56, the pipe 59, back into the settling tank without loss of heat or water. The dirt and sludge in the wash water precipitates to the bottom of the tank and is blown off with the rest of the sludge.

The reagents solution feeder 60 is similar in principal to that disclosed in the United States Letters Patent No. 1,943,039 issued to Dale N. Randolph. The reagent solution delivered to the mixing and heating chamber 14 must be fed in proportion to the volume of water passing through the reactor and settling tank, which represents the water demand of the boiler. The regulation of the solution is maintained by the proportioner 61 which is controlled by a differential pressure effective through the pipes 62 and 63 connected to the supply pipe 10 ahead of and in back of the main orifice valve 13 respectively. Aside from producing an effective pressure on the underside of the operating plunger in the proportioner, the pipe 62 furnishes the water supply to the solution feeder. As shown and described in the aforementioned patent the water enters the lower chamber of the proportioner and flows through a regulating valve operated by the plunger and out the pipe 64 to the top of the proportioning tank 65.

The float 66 in the tank is connected to the flexible cable 67 which passes over the pulleys in the support 68 with its other end fastened to the sheave 69 secured to the shaft 70 which extends across the lower compartment of the tank and has two sheaves 71 and 72 keyed thereto in spaced relation from each other. Each sheave has a flexible cable 73 and 74 connected thereto. The other end of the cable 73 is fastened to the flexible joint 75 of the outlet pipe 76 and the cable 74 is fastened to the free end of the same pipe. The sheave 72 is twice the diameter of the sheave 71; thus the movement of the float 66 operates the cable 67, thereby rotating the shaft 70 for raising or lowering the discharge pipe 76 in substantially a straight line movement.

The reagent solution is thus drawn off from the lower compartment of the tank 65, through the discharge pipe 76 and passes down through the flexible pipe connection 78 into the open top suction cup 79 from whence it is drawn into the suction connection of the pump 80 and is forced past the check valve 81 and the gate valve 82 to the delivery pipe 29 which discharges the reagent solution into the mixing-heater tank 14.

As the demand for water by the boiler feed pump varies, the settling tank water level 30 changes and the float 39 operates the valve 12 to admit the proper amount of water to maintain a constant level in the settling tank. This produces variations in pressure on either side of the main orifice valve 13, thereby operating the proportioner 61 and changes the level of the liquid in the upper part of the reagent solution feeder 60. The float 66 then operates the shaft 70 to change the elevation of the reagent solution discharge pipe 76 and the proper proportion of the solution is drawn off and discharged into the mixing and heating tank 14. In this manner the proper amount of reagent solution is fed to the reactor tank in proportion to the amount of water to be treated. Thus the hot process of water filtration by gravity is maintained in accordance with the demand of the boiler feed pump.

I claim:

1. In apparatus for continuously supplying treated water at variable rates, the combination of a settling tank having a sludge sump in the bottom thereof and an outlet for treated water therefrom above the sump, a mixing tank above the settling tank, a raw water supply pipe connected to the mixing tank, a regulating valve in the raw water supply pipe, float means responsive to changes in the water level in the settling tank, operative connection between the float means and the regulating valve to regulate the admission of raw water to the mixing tank, a feeder for a reagent solution having an outlet which is connecting to the mixing tank, control means for said outlet responsive to the rate of admission of raw water to the mixing tank to proportionate the supply of reagent solution to that of raw water to the mixing tank, means for heating the water and the reagent solution within the mixing tank, a reaction tank submerged within the settling tank and open at the top thereof, a pipe leading downwardly from the bottom of the mixing tank into the reaction tank to a point adjacent the bottom of the latter to conduct the mixed raw water and reagent solution to the reaction tank, a sludge collector submerged within the reaction tank, means for discharging sludge from the collector to the sludge sump in the settling tank, a sand filter connected to the treated water outlet of the settling tank, and means for directing the treated water from the sand filter to service.

2. In apparatus for continuously supplying treated water, the combination of a settling tank having a sludge sump in the bottom thereof and an outlet for treated water above the sump, a mixing tank for raw water, a reagent solution and steam, said mixing tank being of substantially cylindrical cross sectional form, closed at its top and having a bottom outlet, means for introducing the several fluids into the mixing tank, the admission means for one of said fluids having an outlet orifice disposed tangentially to a circle the center of which is axial of the tank to produce a whirling movement of the fluids within the mixing tank, a reaction tank within the settling tank and having its open top below the level of water in the settling tank, a pipe connecting the bottom outlet of the mixing tank with the reaction tank at a point adjacent the bottom of the reaction tank, a sludge collector submerged within the reaction tank, means for discharging sludge from the collector to the sludge sump, and means for withdrawing treated water from the outlet of the settling tank.

3. In apparatus for continuously supplying treated water, the combination of a settling tank having a sludge sump in the bottom thereof and an outlet for treated water above the sump, a mixing tank for raw water, a reagent solution and steam, said mixing tank being of substantially cylindrical cross sectional form, closed at its top and having a bottom outlet, means for introducing the several fluids into the mixing tank, the admission means for one of said fluids having an outlet orifice disposed tangentially to a circle the center of which is axial of the tank to produce a whirling movement of the fluids within the mixing tank, means regulating the quantity of reagent solution to the mixing tank, said regulating means responsive to the quantity of raw water admitted to the mixing tank, a reaction tank within the settling tank and having its open top below the level of water in the settling tank, a pipe connecting the bottom outlet of the mixing tank with the reaction tank at a point adjacent the bottom of the reaction tank, a sludge collector submerged within the reaction tank, means for discharging sludge from the collector to the sludge sump, and means for withdrawing treated water from the outlet of the settling tank.

4. In apparatus for continuously supplying treated water, the combination of a settling tank having a sludge sump in the bottom thereof and an outlet for treated water above the sump, a mixing tank for raw water, a reagent solution and steam, said mixing tank being of substantially cylindrical cross sectional form, closed at its top and having a bottom outlet, means for introducing the several fluids into the mixing tank, the admission means for one of said fluids being disposed tangentially to a circle the center of which is axial of the tank to produce a whirling movement of the fluids within the mixing tank, a reaction tank within the settling tank and having its open top below the water level in the settling tank, a pipe connecting the bottom outlet of the mixing tank with the reaction tank at a point adjacent the bottom of the reaction tank, a sludge collector submerged within the reaction tank, a cylindrical baffle with open ends having its lower end within the sludge collector and its upper end below the level of water in the settling tank, means for discharging sludge from the collector to the sludge sump, and means for withdrawing treated water from the outlet of the settling tank.

5. In apparatus for continuously supplying treated water, the combination of a settling tank having a sludge sump in the bottom thereof, a mixing tank for raw water, a reagent solution and steam, said mixing tank being of substantially cylindrical cross sectional form, closed at its top and having a bottom outlet, means for introducing the several fluids into the mixing tank, the admission means for one of said fluids being disposed tangentially to a circle the center of which is axial of the tank to produce a whirling movement of the fluids within the mixing tank, a reaction tank within the settling tank and having its open top below the water level in the settling tank, a pipe connecting the bottom outlet of the mixing tank with the reaction tank at a point adjacent the bottom of the reaction tank, a sludge collector submerged within the reaction tank, means for discharging sludge from the collector to the sludge sump, an inverted collector shell for clear water having a closed top and open bottom submerged below the water level in the settling tank, and means for withdrawing treated water from within the collector shell.

6. In apparatus for continuously supplying treated water, the combination of a settling tank having a sludge sump in the bottom thereof, a mixing tank above the settling tank for raw water, a softening reagent solution and steam, means for introducing the several fluids into the mixing tank, the admission means for one of said fluids having an orifice disposed tangentially to a circle the center of which is axial of the tank to produce a whirling movement of the fluids within the mixing tank, two frusto-conical shells joined at their small ends, a partition wall interposed between said shells where they are joined together, said shells being disposed vertically within the settling tank below the water level forming an upwardly open reaction tank and a downwardly open clear water collector, a downcomer pipe connecting the mixing tank with the reaction tank adjacent the bottom of the latter, a sludge collector submerged within the reaction tank, means for discharging the sludge from the sludge collector to the sludge sump, and means for drawing treated water from the collector.

7. In apparatus for continuously supplying treated water, the combination of a settling tank having a sludge sump in the bottom thereof, a mixing tank above the settling tank for raw water, a softening reagent solution and steam, means for introducing the several fluids into the mixing tank, the admission means for one of said fluids having an orifice disposed tangentially to a circle the center of which is axial of the tank to produce a whirling movement of the fluids within the mixing tank, two frusto-conical shells joined at their small ends, a partition wall interposed between said shells where they are joined together, said shell being disposed vertically within the settling tank below the water level forming an upwardly open reaction tank and a downwardly open clear water collector, a downcomer pipe extending from the mixing tank deep into the reaction tank, a sludge collector submerged within the reaction tank, a cylindrical baffle having its lower edge within the sludge collector and its upper edge below the surface of the water in the settling tank, means for discharging the sludge from the sludge collector to the sludge sump, and means for drawing clear water from the collector.

8. In apparatus for continuously supplying treated water, the combination of a settling tank having a sludge sump in the bottom thereof, a mixing tank above the settling tank for raw water, a softening reagent solution and steam, means for introducing the several fluids into the mixing tank, the means for introducing one of said fluids having an outlet orifice disposed tangentially to a circle the center of which is axial of the tank to produce a whirling motion of the fluids in the mixing tank, two frusto-conical shells joined at their small ends, a partition wall interposed between said shells where they are joined together, said shells being disposed vertically within the settling tank below the water level forming an upwardly open reaction tank and a downwardly open clear water collector, a pipe connecting the mixing tank to the reaction tank at a point adjacent the bottom of the latter, an upwardly open conically shaped sludge collector submerged within the reaction tank and having substantially the same slope as the latter, means for discharging the sludge from the sludge collector to the sludge sump, and means for withdrawing treated clear water from the collector.

9. In apparatus for continuously supplying treated water, the combination of a settling tank having a sludge sump in the bottom thereof, a mixing tank above the settling tank for raw water, a softening reagent solution and steam, means for introducing one of said fluids having an outlet orifice disposed tangentially to a circle the center of which is axial of the tank to produce a whirling motion of the fluids within the mixing tank, means for equalizing the pressure between the mixing tank and the settling tank, an upwardly open reaction tank submerged within the settling tank, a pipe connecting the bottom of the mixing tank to the reaction tank, a sludge collector submerged within the reaction tank, means for discharging the sludge from the collector to the sludge sump, and means for withdrawing treated water from the settling tank.

10. In a mixing tank for use with a settling tank in water softening apparatus, the combination of a shell closed at its upper end, a downcomer pipe connected to the lower end of the shell and extending into the settling tank, a raw water supply pipe passing through the wall of the shell, a nozzle on the end of said pipe for directing the water in a fine spray tangentially against the interior of the shell, means for admitting steam into the mixing tank for heating the swirling water, means for admitting a reagent solution into the swirling water, and a pressure equalizing connection between the mixing tank and the settling tank and having a hood thereover to prevent the water from escaping therethrough.

11. In a mixing tank for use with a settling tank in water softening apparatus, the combination of a shell closed at its upper end, a downcomer pipe connected to the lower end of the shell and extending into the settling tank, a raw water supply pipe passing through the wall of the shell, a nozzle on the end of said pipe for directing the water in a fine spray tangentially against the interior of the shell, means for admitting steam into the mixing tank for heating the swirling water, means for admitting a reagent solution into the swirling water as it passes into the downcomer pipe, a pressure equalizing connection between the mixing tank and the settling tank, means for preventing water from escaping from the mixing tank to the settling tank through said pressure equalizing connection, and valve control means for venting said mixing tank to atmosphere.

12. In a reaction tank and a clear water tank for use in a water softening settling tank, the combination of two frusto conical shells joined at their small ends, a partition wall interposed between said shells where they are joined together, and means for supporting said shells vertically within the settling tank submerged below the water level forming an upwardly open reaction tank and a downwardly open clear water collector.

13. In a reaction tank and a clear water tank for use in a water softening settling tank, the combination of two frusto conical shells joined at their small ends, a partition wall interposed between said shells where they are joined together, means for supporting said shells vertically within the settling tank submerged below the water level forming an upwardly open reaction tank and a downwardly open clear water collector, a downcomer pipe closely adjacent the partition wall within the reaction tank, and a draw-off pipe closely adjacent the partition wall in the clear water collector tank.

14. In a reaction tank and a clear water tank for use in a water softening settling tank, the combination of two frusto conical shells joined at their small ends, a partition wall interposed between said shells where they are joined together, means for supporting said shells vertically within the settling tank submerged below the water level forming an upwardly open reaction tank and a downwardly open clear water collector, a downcomer pipe closely adjacent the partition wall within the reaction tank, a draw-off pipe closely adjacent the partition wall in the clear water collector tank, an open top sludge collector tank immersed within the reaction tank, and means for discharging the sludge from the collector tank.

15. In a reaction tank and a clear water tank for use in a water softening settling tank, the combination of two frusto conical shells joined at their small ends, a partition wall interposed between said shells where they are joined together, means for supporting said shells vertically within the settling tank submerged below the water level forming an upwardly open reaction tank and a downwardly open clear water collector, a downcomer pipe closely adjacent the partition wall within the reaction tank, a draw-off pipe closely adjacent the partition wall in the clear water collector tank, an open top sludge collector tank immersed within the reaction tank, and a pipe connecting the bottom of the sludge collector tank to the bottom of the settling tank for continuously discharging sludge thereto.

16. In a reaction tank and a clear water tank for use in a water softening settling tank, the combination of two frusto conical shells joined at their small ends, a partition wall interposed between said shells where they are joined together, means for supporting said shells vertically within the settling tank submerged below the water level forming an upwardly open reaction tank and a downwardly open clear water collector, a downcomer pipe closely adjacent the partition wall within the reaction tank, a draw-off pipe closely adjacent the partition wall in the clear water collector tank, an open top sludge collector tank immersed within the reaction tank, a tubular baffle member immersed within the reaction tank and extending into the sludge collector to permit the water displaced by sludge in the collector to circulate upwardly therethrough, and means for discharging the sludge from the collector tank.

17. A water softening tank structure consisting of a closed settling tank having inlet and outlet connections, an upwardly open reaction tank in the settling tank submerged below the normal water level of the settling tank, said inlet opening into the reaction tank adjacent the bottom thereof, an upwardly open sludge collector tank positioned in the reaction tank below the top of the latter and above the inlet opening for removing the sludge from the water as it flows up out of the reaction tank to the settling tank, and a pipe extending through the reaction tank for conveying the sludge from the sludge collector to the bottom of the settling tank.

18. A water softening tank structure consisting of a closed settling tank having inlet and outlet connections, an upwardly open reaction tank in the settling tank submerged below the normal water level of the settling tank, said inlet opening into the reaction tank adjacent the bottom thereof, an upwardly open sludge collector tank positioned in the reaction tank below the top of the latter and above the inlet opening for removing the sludge from the water as it flows up out of the reaction tank to the settling tank, a pipe extending through the reaction tank for conveying the sludge from the sludge collector to the bottom of the settling tank, and independent means for withdrawing sludge from the bottom of the reaction tank and the bottom of the settling tank.

EMIL G. DUDEN.